Jan. 3, 1956
F. T. NIELSSON
2,729,554
AMMONIATION OF SUPERPHOSPHATE
Filed Dec. 26, 1952
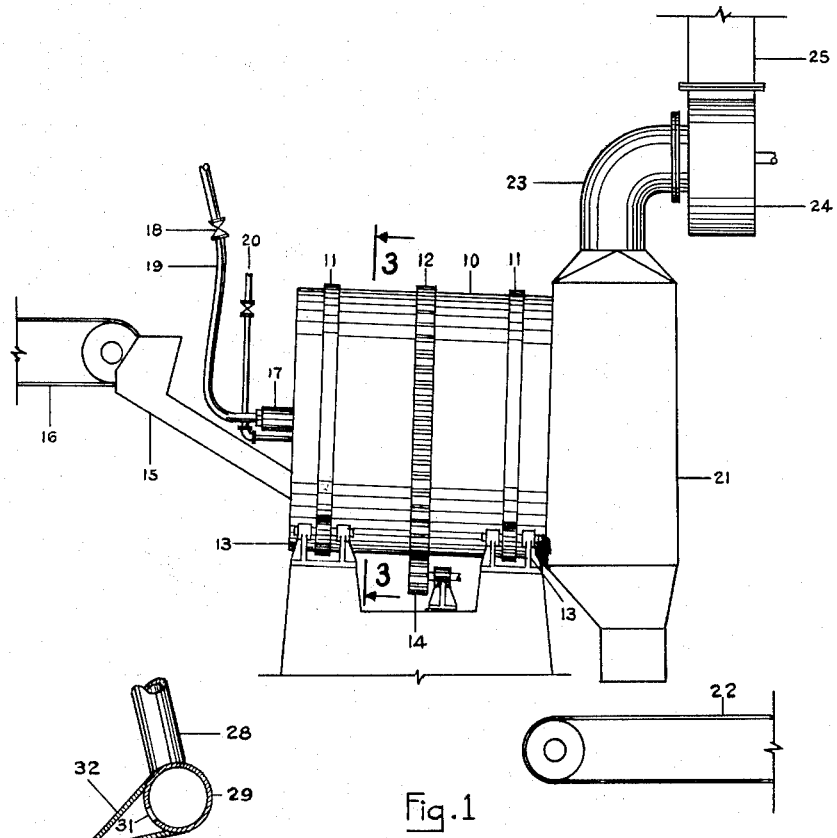
Fig. 1
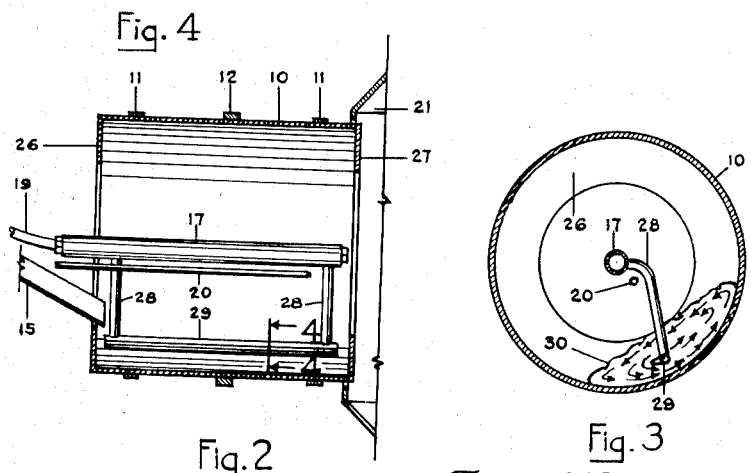
Fig. 4
Fig. 2
Fig. 3
Francis T. Nielsson INVENTOR.
BY Bentley C. Morrow
Attorney

United States Patent Office 2,729,554
Patented Jan. 3, 1956

2,729,554
AMMONIATION OF SUPERPHOSPHATE

Francis T. Nielsson, Sheffield, Ala., assignor to Tennessee Valley Authority, a corporation of the United States Application December 26, 1952, Serial No. 328,156

3 Claims. (Cl. 71—43)

(Granted under Title 35, U. S. Code (1952), sec. 266)

The invention herein described may be manufactured and used by or for the Government for governmental purposes without payment to me of any royalty thereon.

This invention relates to a process for continuously ammoniating superphosphate.

The treatment of superphosphate with ammonia is practiced widely in the fertilizer industry. Liquid or gaseous anhydrous ammonia, aqua ammonia, or ammoniating solutions containing free ammonia and a solid nitrogen carrier such as ammonium nitrate or urea are employed as ammoniating agents.

The most commonly used type of equipment for ammoniating superphosphate is the rotary batch mixer. A quantity of superphosphate is fed into the mixer, and aqua ammonia or solution is introduced while the mixer is rotated.

A pug-mill type of ammoniator has been developed for continuous operation. The machine consists of a tube having a central shaft on which are mounted blades set at a pitch to move the material forward in a violent state of agitation. Ammoniating solution is sprayed through nozzles set in a recess along the top of the tube.

Among other types of equipment that have been proposed for continuous ammoniation are screw conveyors and ribbon mixers.

Continuous ammoniation of superphosphate in equipment of the type described above can be carried out without undue difficulty when aqua ammonia or an ammoniating solution is used as the source of ammonia. With anhydrous ammonia, however, considerable difficulty has been encountered. In order to minimize loss of ammonia, it has been the practice to carry out the ammoniation in closed equipment, with gas off-takes provided to transfer the evolved water vapor and ammonia to ammonia-recovery facilities. Closed equipment of this type requires sealed inlet and discharge openings and special bearings that are not always effective and are troublesome from the maintenance standpoint. Moreover, in a closed system the material undergoing ammoniation is always in contact with an atmosphere of water vapor. Condensation of water vapor takes place on the relatively cool superphosphate entering the equipment. The amount of water condensed is sufficient, usually, to turn the superphosphate to a thick, pasty mass which soon clogs the equipment. Conversion of a part of the $P_2O_5$ to a form unavailable to plants also occurs during ammoniation.

It is an object of this invention to provide a process for ammoniating superphosphate whereby a high degree of ammoniation of superphosphate is attained without undue reversion of available $P_2O_5$ to unavailable form.

A further object is to provide a process for ammoniating superphosphate in which loss of ammonia is negligible and in which ammonia-recovery facilities are not required.

Another object is to provide a process for ammoniating superphosphate in which either anhydrous ammonia, aqua ammonia, or ammoniating solution can be employed.

Another object is to provide a process in which no condensation of water vapor takes place and the product is obtained in coarse granular form.

Other objects and advantages of the invention will become apparent as this disclosure proceeds.

The process of my invention comprises the steps of continuously introducing a multiplicity of particles of superphosphate-containing material into an ammoniation zone to maintain a bed therein; passing the particles through the zone in a continuous curved path in the bed; continuously introducing ammoniating fluid beneath the surface of the bed at a multiplicity of points in said curved path whereby each particle encounters ammoniating fluid many times during its passage through the zone.

In the accompanying drawing, Figure 1 is a vertical view depicting components of one preferred device which may be operated according to principles of my invention; Figure 2 is a vertical sectional view of the rotary drum ammoniator shown in Figure 1 taken along the longitudinal axis thereof; Figure 3 is a sectional view taken on line 3—3 of Figure 1; and Figure 4 is a sectional view taken on line 4—4 of Figure 2.

Referring to Figure 1, the numeral 10 designates a rotary drum fitted with tires 11 and spur gear 12. Drum 10 is mounted on trunnions 13 and driven through gear 14 by a motor (not shown). Numeral 15 designates a feed chute which is adapted to convey superphosphate from feeder-conveyor 16 to the interior of drum 10. Ammonia-containing fluid from a source not shown is fed to manifold 17 mounted within drum 10 via control valve 18 and flexible conduit 19.

Water for cooling purposes is introduced via valved line 20. The portion of line 20 within the drum is perforated so as to direct a spray of water onto the material in the drum.

Hood 21 is disposed about the lower end of the drum 10. The lower portion of hood 21 is adapted to conduct ammoniated superphosphate discharged from the drum 10 to product conveyor 22. Duct 23 at the upper end of hood 21 communicates with fan 24 and stack 25. Fan 24 induces a flow of air through drum 10 and discharges this air, laden with moisture and any fumes evolved in drum 10, to the atmosphere.

Figure 2, a longitudinal, cross-sectional view of drum 10, shows retaining rings 26 and 27 disposed at the feed and discharge ends, respectively, of the drum to maintain a bed of material of substantial depth therein. Ammonia distributing member 29 is disposed near the lower inner wall of drum 10 at a location from 20° to 40° from a vertical diameter in the direction of rotation of the drum and parallel to its axis.

Manifold 17 is disposed along the axis of drum 10. Communicating with manifold 17 are supply tubes 28 which in turn communicate with slotted distribution member 29.

In Figure 3 the dotted line 30 designates the level of the bed of material within drum 10. Arrows show the flow of material within the bed of material. It is to be noted that distribution member 29 is positioned well beneath the surface of the bed at a point where the material within the bed is moving upwardly in the direction of rotation of drum 10. The ammonia is introduced in a direction countercurrent to the movement of the solid material.

Figure 4 shows a preferred construction of distribution member 29, comprising a length of pipe having closed ends. Supply tubes 28 communicate with this pipe near the ends thereof. Holes 31 are drilled at intervals through the wall of the pipe. The size of these holes is graduated, with the smallest holes at the ends of the pipe and the largest holes at the center. Plates 32 are secured to the pipe so that the assembly presents minimum resistance to the flow of material past the distributor and to form a constricted slot 33 that extends the length of the distributor. The ends of the distributor are closed.

The combination of the graduated-size holes and the constricted slot gives a flow of ammoniating fluid from the distributor that increases uniformly from a minimum at the ends of the distributor to a maximum at the center.

In operation, superphosphate is fed at a constant rate by feeder-conveyor 16 into chute 15 and into drum 10. A bed of superphosphate having a depth equal to about one-fourth to two-fifths of the diameter of the drum is maintained within the drum by retaining ring 27 at the discharge end of the drum. Material is kept from spilling out of the feed end of the drum by retaining ring 26. Rotation of the drum causes the bed to assume the configuration indicated by numeral 30 in Figure 3. The steepness of the inclination of the bed depends, of course, upon the speed of rotation. Preferably, the speed of rotation is such that the inclination is between 30° and 45° to the horizontal. Under such conditions there is a relatively thick layer of material moving upward at a speed slightly less than the peripheral speed of the drum and a relatively thin layer of material at the surface of the bed moving downwardly at a substantially greater speed. This action causes a thorough mixing of the material in the drum and causes each particle of superphosphate to be exposed to ammonia a number of times as it progresses from the inlet to the outlet of the drum.

Ammoniating fluid fed into manifold 17 at a constant rate passes through supply tubes 28 into the slotted distribution member 29. The rate of introduction of ammoniating fluid is regulated according to the rate of introduction of superphosphate and the amount of nitrogen desired in the product. The fluid leaves the slotted member in a broad, ribbonlike stream parallel and countercurrent to the movement of material in the bed. The rate at which the fluid is introduced into the bed is greatest at the center of the member and diminishes gradually to a minimum at either end of the member.

The reactions that take place during ammoniation of the superphosphate are exothermic, and the heat liberated causes vaporization of some of the water present. A flow of air through the drum, induced by fan 24, carries off this water vapor. Were this water vapor not removed, condensation would take place on the incoming superphosphate, turning it to a thick, pasty mass.

At times, particularly when anhydrous ammonia is being used, it is necessary to spray a small amount of water onto the bed to cool the material. Overheating of the material causes excessive reversion of available $P_2O_5$ to an unavailable form. It is not necessary to spray water when aqua ammonia or ammoniating solution is used.

Ammoniated superphosphate discharged from drum 10 is conveyed to storage or cooling facilities by conveyor 22.

A significant difference between the operation of my process and prior processes lies in the fact that each particle of superphosphate comes in contact with ammoniating fluid many times during its passage through the ammoniating zone. Although the particles introduced form a bed, the individual particles are passed through the ammoniation zone in a continuous curved path approximating a flattened helix. Ammonia is introduced beneath the surface of the bed at a multiplicity of points in the path of each particle. This results in a slow and continuing absorption of ammonia. It is to this slow and continuing absorption of ammonia that I attribute the low losses of ammonia and the low reversion of $P_2O_5$ to unavailable form that characterize my process.

Studies have shown that in my novel process either anhydrous ammonia, aqua ammonia, or ammoniating solution can be employed without significant loss of ammonia. I have also found that in my process it is possible to fix substantially greater proportions of free ammonia than are fixed by prior processes and apparatus and that reversion of available $P_2O_5$ to unavailable form is less in my process than in prior processes. A further advantage of my invention is that a large proportion of the superphosphate treated is converted to a desirable granular form.

Tests of my invention were carried out in an experimental ammoniator 3 feet in diameter by 3 feet long, constructed according to the attached drawings. The drum had 9-inch retaining rings at either end, leaving annular openings 18 inches in diameter. The drum was inclined downwardly from feed end to discharge end at an angle of 3° to the horizontal. The drum was rotated at a speed of 10 revolutions per minute.

A slotted ammonia-distribution member, constructed as shown in Figure 4, was positioned within the drum as described.

Example I

Tests of my invention were carried out on the treatment of concentrated superphosphate with gaseous anhydrous ammonia. The feed superphosphate was made from Florida rock phosphate and phosphoric acid made by the electric-furnace method. It contained 48 per cent total $P_2O_5$ and 46.5 per cent available $P_2O_5$. The superphosphate was fed to the experimental ammoniator at a rate of 1000 pounds per hour.

In order to obtain a comparison between the effectiveness of my process in the experimental ammoniator and conventional equipment, tests were also carried out in a batch mixer of the type used commercially for ammoniating superphosphate. The batch mixer was 5 feet in diameter and 5 feet long. The batch mixer was loaded with 1000 pounds of concentrated superphosphate, and anhydrous ammonia was introduced beneath the bed of material in the mixer. Ammonia was introduced over a period of 2 minutes to attain 4 per cent N in product and 90 minutes to attain N contents higher than 4 per cent in product. The material was allowed to remain in the drum for 90 minutes.

The following table gives the results of these tests:

| Nitrogen content of product, percent | Experimental [1] ammoniator | | Batch mixer | |
| --- | --- | --- | --- | --- |
| | Loss in available $P_2O_5$, percent | Nitrogen loss, percent | Loss in available $P_2O_5$, percent | Nitrogen loss, percent |
| 2.5 | | | 3.7 | 0 |
| 3.7 | 2.5 | 0 | 5.9 | 0 |
| 4.2 | 2.1 | 0 | | |
| 6.0 | 2.7 | 0 | 6.3 | 10 |
| 6.5 | | | 6.3 | 15 |
| 7.6 | 3.8 | 2 | | |
| 8.0 | 5.4 | 3 | 6.3 | 20 |
| 8.4 | | | 6.4 | 25 |
| 9.2 | 5.5 | 0 | | |

[1] In tests in which more than 7 percent nitrogen was introduced into the product, water was sprayed onto the material in the ammoniator.

These tests demonstrated that with my process and the experimental ammoniator it was possible to ammoniate superphosphate to a higher degree than was possible with the conventional batch ammoniator. At the same time, reversion of $P_2O_5$ to unavailable form and loss of nitrogen were lower with the experimental ammoniator at comparable degrees of ammoniation.

Other types of ammoniating equipment and processes were tried, including a closed ribbon mixer, but in all cases loss of available $P_2O_5$ and loss of nitrogen were higher than with the experimental ammoniator.

Example II

Cooperative tests were also made on the preparation of a high-analysis mixed fertilizer using ammoniating solution, ammonium sulfate, ordinary superphosphate, and potassium chloride. These ingredients were fed to the experimental ammoniator and to the batch mixer in proportions to give a product having a ratio of $N:P_2O_5:K_2O$ of approximately 1:1:1.

The superphosphate in the mixture fed to the experimental ammoniator contained 20.5 per cent total $P_2O_5$ and 19.6 per cent available $P_2O_5$. The superphosphate in the mixture fed to the batch mixer contained 19.3 per cent total $P_2O_5$ and 18.1 per cent available $P_2O_5$. The ammoniating solution used in both tests contained 55.5 per cent $NH_4NO_3$, 26 per cent free $NH_3$, and 18.5 per cent $H_2O$. The feed rate of solid material to the experimental ammoniator was 1000 pounds per hour. Batches of 1000 pounds of solid materials were loaded into the batch mixer. The results of these tests are given in the following table.

|  | Experimental ammoniator | Batch mixer |
|---|---|---|
|  | Percent | Percent |
| Total N in product | 10.8 | 10.0 |
| Ammoniacal N in product | 8.0 | 8.9 |
| Total $P_2O_5$ in product | 11.4 | 10.9 |
| Available $P_2O_5$ in product | 10.8 | 9.7 |
| $K_2O$ in product | 10.2 | 10.5 |
| Loss of free ammonia during ammoniation | 6.0 | 10.0 |
| Loss of available $P_2O_5$ during ammoniation | 1.7 | 4.9 |

The results of these tests showed that although the batch mixer was more efficient when operated with ammoniating solution than with anhydrous ammonia, losses of free ammonia and available $P_2O_5$ were still much higher with the batch mixer than with the continuous experimental ammoniator and my process.

*Example III*

Tests also demonstrated that by my process and apparatus the ammoniated product was obtained in granular form. The following results were obtained in a series of tests in which concentrated superphosphate was treated with anhydrous ammonia and in which water was sprayed onto the material within the drum at a rate of 5 to 6 pounds of water per 100 pounds of superphosphate.

| Material | Nitrogen content, percent | Screen analysis, U. S. Standard, Percent | | |
|---|---|---|---|---|
|  |  | +4 mesh | −4+50 mesh | −50 mesh |
| Feed (average) |  | 0 | 55.3 | 44.7 |
| Product | 7.7 | 0 | 99.1 | 0.9 |
| Do | 8.0 | 2.0 | 96.0 | 2.0 |
| Do | 8.1 | 3.3 | 92.1 | 4.6 |

Tests were also carried out in which concentrated superphosphate was treated with ammoniating solution containing 26 per cent $NH_3$, 55.5 per cent $NH_4NO_3$, and 18.5 per cent $H_2O$. The following results were obtained.

| Material | Nitrogen content, percent | Screen analysis, U. S. Standard, Percent | | |
|---|---|---|---|---|
|  |  | +4 mesh | −4+50 mesh | −50 mesh |
| Feed (average) |  | 0 | 55.3 | 44.7 |
| Product | 8.1 | 1.4 | 95.9 | 2.7 |
| Do | 8.8 | 1.7 | 97.3 | 1.0 |
| Do | 11.7 | 5.4 | 93.9 | 0.7 |

In all these tests the product was in the form of hard, well-rounded granules.

*Example IV*

The equipment was operated continuously according to my process in a run of 20 hours' duration at a rate of 1800 pounds of ammoniated product per hour. Ordinary superphosphate and potassium chloride were added to the ammoniator at rates of 1000 pounds per hour and 550 pounds per hour, respectively. Ammoniating solution (55.5% $NH_4NO_3$, 26.0% neutralizing ammonia, 18.5% $H_2O$) was added at a rate of 234 pounds per hour to yield a product containing 6.8 per cent N, 11.6 per cent available $P_2O_5$, and 12.6 per cent $K_2O$. Loss of $P_2O_5$ availability was 0.9 per cent and loss of neutralizing ammonia was 3.4 per cent. The degree of ammoniation (6.7 lbs. neutralizing $NH_3$ per unit available $P_2O_5$ in the feed) was considerably higher than the ratio recommended by suppliers of ammoniating solution (2.5–3.5 lbs. neutralizing $NH_3$ per unit available $P_2O_5$ in the feed). No cleaning of the ammoniator was required during this operating period.

Various modifications of the ammonia-distributing member may be substituted for that shown and described, if desired. For instance, plates 32 might be omitted although they are well worth their cost, both in securing even distribution of ammonia and in preventing clogging of holes 31; or the member might be made without a wall between the interior of the tube shown in Figure 4 and the space limited by plates 32, provided that slot 33 is constructed with sufficient accuracy.

It also has been found technically feasible to spray sulfuric or phosphoric acid (but not nitric) on the superphosphate bed during ammoniation to obtain greater degrees of ammoniation through neutralization of the acid and, because the water vapors evolved have been carried away, a dried product results in which ammonium phosphate or ammonium sulfate had been formed in situ.

Other modifications may be made without departing from the spirit of the invention, which is limited only by the subtended claims.

I claim as my invention:

1. A process for ammoniating superphosphate which comprises continuously introducing superphosphate into an upper end of an inclined drum; therein maintaining a bed of rolling discrete particles of superphosphate having a depth of about one fourth to two fifths of the diameter of the drum; maintaining the surface of the bed of rolling particles at an inclination of about 30° to 45° to the horizontal diameter of the drum; passing each of the particles through the bed from end to end of the drum in a continuous curved path approximating a flattened helix of many turns, having upward-inclined turns adjacent to the inner surface of the drum and downward-inclined turns adjacent to the upper surface of the bed; passing the particles at lower speed through upward turns of the helical path than through descending turns; continuously introducing ammoniating fluid beneath the surface of the bed in a broad stream countercurrent to the upward movement of said particles in such path, the breadth of said stream extending substantially the entire length of the bed; maintaining substantially greater rate of flow in a central part of the stream of ammoniating fluid than in the edges of said stream; continuously passing a current of air over the surface of said bed; and withdrawing ammoniated product from the lower end of the drum.

2. A process for ammoniating superphosphate which comprises continuously introducing fertilizer material containing superphosphate into an upper end of an inclined drum; therein maintaining a bed of rolling discrete particles of such material having a depth of about one fourth to two fifths of the diameter of the drum; maintaining the surface of the bed of rolling particles at an inclination of about 30° to 45° to the horizontal diameter of the drum; passing each of the particles through the bed from end to end of the drum in a continuous curved path approximating a flattened helix of many turns, having upward-inclined turns adjacent to the inner surface of the drum and downward-inclined turns adjacent to the upper surface of the bed; passing the particles at lower speed through upward turns of the helical path than through descending turns; continuously introducing ammoniating fluid beneath the surface of the bed in a broad stream countercurrent to the upward movement of said particles in such path, the breadth of said stream extending substantially the entire length of the bed; maintaining substantially greater rate of flow in a central part of the stream of ammoniating fluid than in the edges of said stream; continuously passing a current of air over the surface of said bed; and withdrawing ammoniated product from the lower end of the drum.

3. A process for ammoniating superphosphate which comprises continuously introducing fertilizer material containing superphosphate into an upper end of an inclined drum; therein maintaining a bed of rolling discrete particles of such material having a depth of about one fourth to two fifths of the diameter of the drum; passing each of the particles through the bed from end to end of the drum in a continuous curved path approximating a flattened helix of many turns, having upward-inclined turns adjacent to the inner surface of the drum and downward-inclined turns adjacent to the upper surface of the bed; passing the particles at lower speed through upward turns of the helical path than through descending turns; continuously introducing ammoniating fluid beneath the surface of the bed in a broad stream countercurrent to the upward movement of said particles in such path, the breadth of said stream extending substantially the entire length of the bed; maintaining substantially greater rate of flow in a central part of the stream of ammoniating fluid than in the edges of said stream; continuously passing a current of air over the surface of said bed; and withdrawing ammoniated product from the lower end of the drum.

References Cited in the file of this patent
UNITED STATES PATENTS

| | | |
|---|---|---|
| 1,428,920 | Sturtevant | Sept. 12, 1922 |
| 1,872,024 | Bates | Aug. 16, 1932 |
| 1,948,520 | Harvey | Feb. 27, 1934 |
| 1,959,973 | Wellisch | May 22, 1934 |
| 1,980,008 | Shoeld | Nov. 6, 1934 |
| 2,136,793 | Gabeler et al. | Nov. 15, 1938 |
| 2,287,759 | Hardesty et al. | June 23, 1942 |
| 2,448,126 | Shoeld | Aug. 31, 1948 |
| 2,587,367 | Moritz | Feb. 26, 1952 |